United States Patent [19]

King

[11] Patent Number: 4,524,282

[45] Date of Patent: Jun. 18, 1985

[54] ELECTRO-OPTICAL LEVEL DETECTOR

[75] Inventor: Charles King, Elmira, N.Y.

[73] Assignee: Courser, Incorporated, Elmira, N.Y.

[21] Appl. No.: 391,654

[22] Filed: Jun. 24, 1982

[51] Int. Cl.³ .............................................. G01H 15/06
[52] U.S. Cl. ........................................ 250/577; 356/4
[58] Field of Search ....................... 250/577, 560, 561;
356/4, 376, 381; 73/293

[56] References Cited

U.S. PATENT DOCUMENTS

| 3,821,558 | 6/1974 | Mansfield | 250/577 |
| 3,857,031 | 12/1974 | Sinclair et al. | 356/4 |
| 4,053,227 | 10/1977 | Bodlaj | 356/4 |
| 4,300,836 | 11/1981 | Holmes et al. | 356/376 |

Primary Examiner—David C. Nelms
Assistant Examiner—Jim Gatto
Attorney, Agent, or Firm—Jones, Tullar & Cooper

[57] ABSTRACT

Level detection apparatus for determining the depth of a variable surface with respect to the apparatus is disclosed. The device includes a scanning source which causes an intense, collimated beam of light to move across the surface to be detected. First and second spaced detectors sensitive to light reflected from the surface are located at opposite sides of the scanning source and lie in the plane of the scanned beam so that the source directs light from the reflecting surface onto first one and then the other of the detectors. A circuit responsive to the receipt of the reflected beams by the first and second detectors produces first and second signals which will be spaced in time in accordance with the depth of the surface to be measured. An index signal is generated in synchronization with the rotation of the scanning source, and a comparator circuit is provided for comparing the time delay between the two detector outputs, whereby a level output signal proportional to the depth of the surface is produced.

17 Claims, 8 Drawing Figures

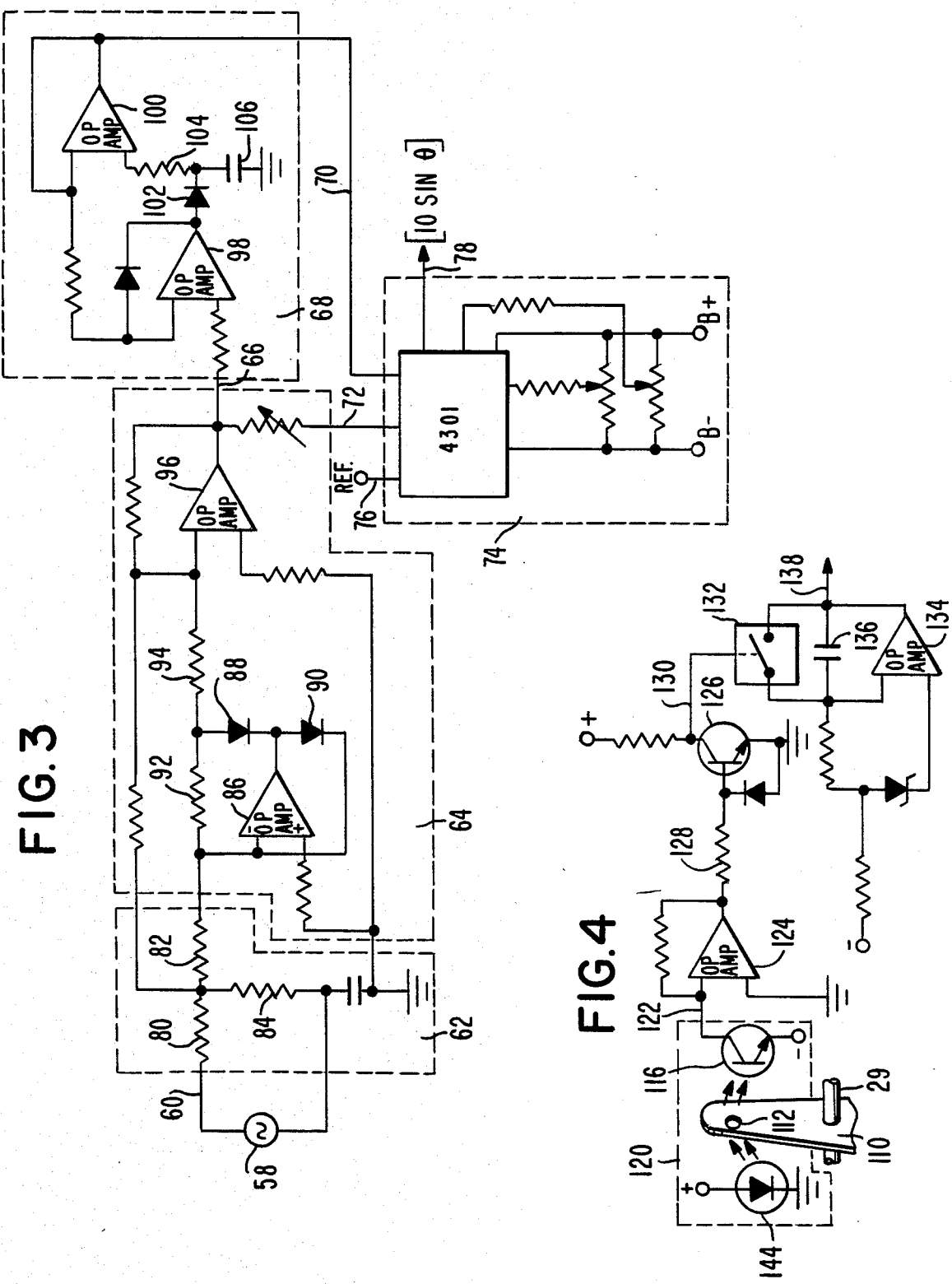

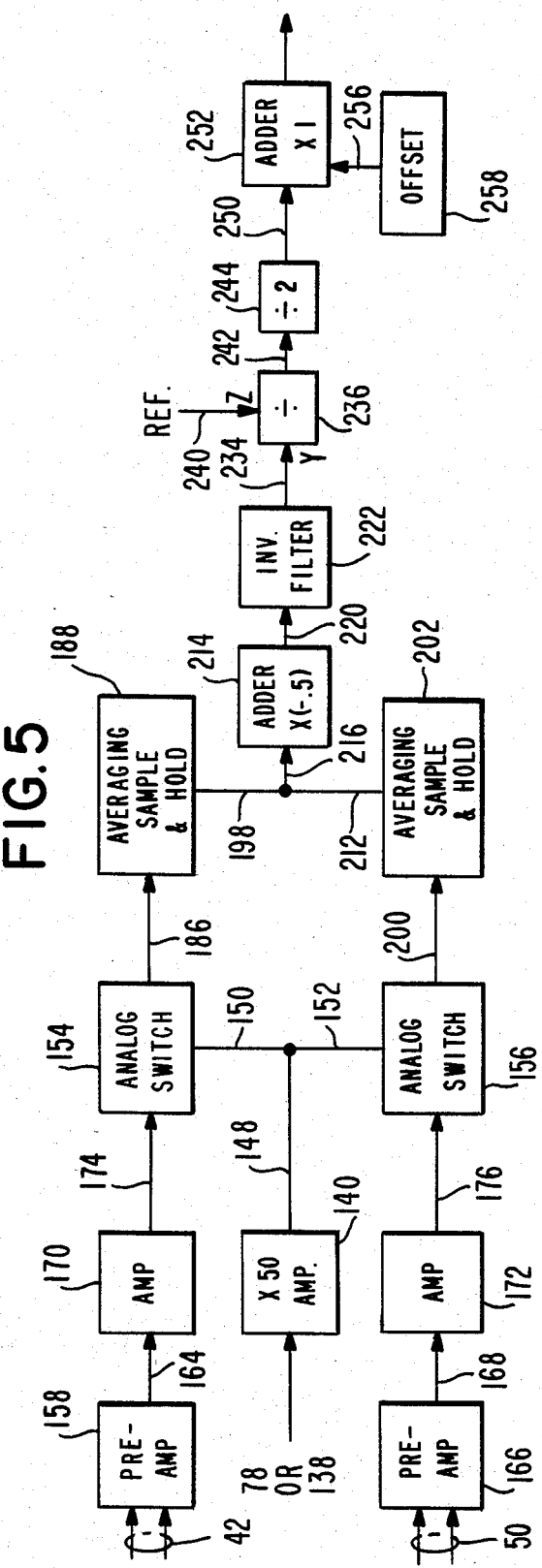
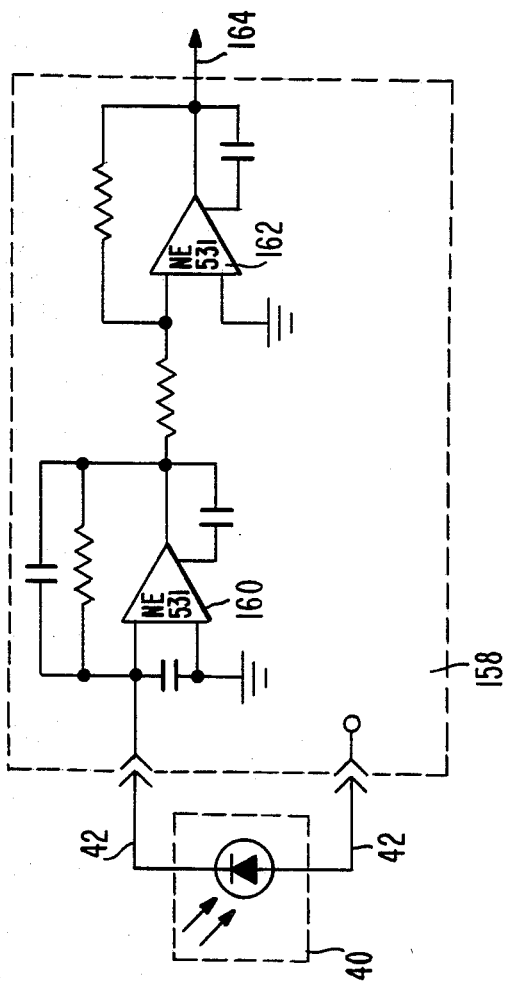

ELECTRO-OPTICAL LEVEL DETECTOR

BACKGROUND OF THE INVENTION

The present invention relates, in general, to level sensing, and more particularly to electro-optical devices for measuring the distance between a reference point and a variable surface such as the surface level of a liquid.

In the measurement of the depth of a liquid below a reference level, and in particular in the measurement of liquids such as molten glass, liquid chemicals of various kinds, fuels such as gasoline, kerosene and the like, and in many other hazardous measurement situations, it has been found desirable to utilize non-contacting methods of measurement. Although the prior art contains numerous contact and nucleonic methods and devices for level measurement, problems of accuracy, repeatability, and sensitivity have been encountered in the measurement of liquid levels, where high temperatures, surface disturbances caused by vibrations, and the like create serious difficulties and result in generally unsatisfactory measurements.

Such problems have been solved in part by optical systems of the type wherein a laser beam is directed at an angle to the glass surface, and vertical displacement of the reflected beam caused by changes in the glass surface position is detected. The detection of laser beam displacement may be achieved, for example, by the use of a geometric photodetector in which variations in the position of the reflected light spot on the detector surface act to change the resistance of the detector. In such devices, the geometric photodetector may be incorporated in a bridge configuration as part of a null balance servo so that movement of the laser spot on the detector due to a change in level of the surface being measured creates an imbalance in the bridge and causes the servo to drive to a new null position. Such motion can be translated electrically to display the new level. Another method of detecting such displacement is disclosed in U.S. patent application Ser. No. 235,400 of Charles King, filed on Feb. 18, 1981 and entitled "Optical Measuring System". That application teaches the use of a curved mirror which directs the reflected light spot onto a rotating mirror which, in turn, directs the spot onto a photodetector when the rotating mirror is at the correct angular position. A displacement of the spot changes the angular position of the rotating mirror at which the spot will be directed onto the photodetector, so that the angular position is a measure of the surface level.

Although such measurement devices have worked well in certain applications, it has been found that they are effectively limited to relatively small level excursions, and in addition, are sensitive to surface irregularities caused by waves or debris, as well as to shifts in the supporting structure, due to barometric pressure changes, ambient temperature changes, and the like. Accordingly, a real need exists for an electro-optical level sensor having a broad range of measurement, greater flexibility in its application to various measurement tasks, reduced maintenance requirements and reduced sensitivity to structural shifting and vibration.

SUMMARY OF THE INVENTION

It is therefore, an object of the present invention to provide an electro-optical level sensing device having an extended range of measurement and being capable of measuring surface levels from greater distances than was previously possible while still maintaining the required degree of accuracy.

It is another object of the invention to provide an electro-optical measuring system that is capable of accurate and reliable measurements in extremes of ambient temperature and which is capable of ignoring surface perturbations due to standing waves, ripples, or the like.

It is a further object of the invention to provide a liquid level measuring device that is less sensitive to structural shifting and vibration than prior devices and which is mechanically simple, rugged and reliable, so as to have a long life expectancy with substantially reduced maintenance.

Briefly, the present invention is directed to an electro-optical measuring device adapted to be mounted directly above a liquid surface, and being capable of measuring the distance between the device and the surface and registering any changes in that distance. The device includes a source of light such as a laser, and a scanning mechanism which causes the light to be scanned across the surface to be measured. Mounted adjacent, and preferably on opposite sides of, the scanning mechanism are first and second spaced detectors which are located so as to receive light reflected from the surface. The scanning mechanism moves the light beam across the surface so that the light will, at a first angle of the scanner, be reflected from the surface onto the first detector and thereafter, at a second angle of the scanner, be reflected on the second detector. Circuit means responsive to the two detector outputs produce first and second signals which are compared to an index signal which varies in synchronization with the motion of the scanner, thereby relating the time delay between the first and second detector outputs to the position of the scanner.

In a preferred form of the invention, an index signal is provided, and this signal is referenced to each of the detector outputs, in turn. The detector signal output values are then used to produce output signals which are proportional to the angle of reflection of the light from the surface to be measured, and, since the distance between the light scanning source and the detectors is known, this angle can be used to calculate the vertical distance between the light scanning source and the surface of the material being measured; i.e., the depth of the surface.

In one form of the invention, the index signal is provided by the A.C. source which drives the rotating scanner motor, with an index circuit producing an index signal which tracks with the sign of the power supply to the motor. If the scanning mechanism had a known angular position (index point) at the zero crossover of the A.C. drive signal, then the angle at which the light is reflected from the surface can be calculated from a measurement of the times at which the detector signals are produced after the zero crossover. In another form of the invention, the index signal may be an electrical ramp valve which may be initiated and sampled at preselected angular positions (index points) of the scanner mechanism. In this arrangement, the values of the detector signals are similarly proportional to the angles of reflection of the light beam to first one and then the other of the detectors but are ratioed with the index ramp valve and thus are proportional to the depth of the surface independently of variations in scanner rotation speed.

BRIEF DESCRIPTION OF THE DRAWINGS

The foregoing and additional objects, features and advantages of the present invention will become apparent to those of ordinary skill in the art upon a consideration of the following detailed description of preferred embodiments, taken in conjunction with the accompanying drawings, in which:

FIG. 3 is a schematic diagram of the circuit of FIG. 2;

FIG. 4 is an alternate circuit for producing a time-variable index signal;

FIG. 5 is a block diagram of the measurement circuit for the electro-optical detector of FIG. 1; and FIGS. 6, 7, and 8 are schematic diagrams of the circuit shown in the block diagram of FIG. 5.

DESCRIPTION OF THE PREFERRED EMBODIMENTS

Figure 1:
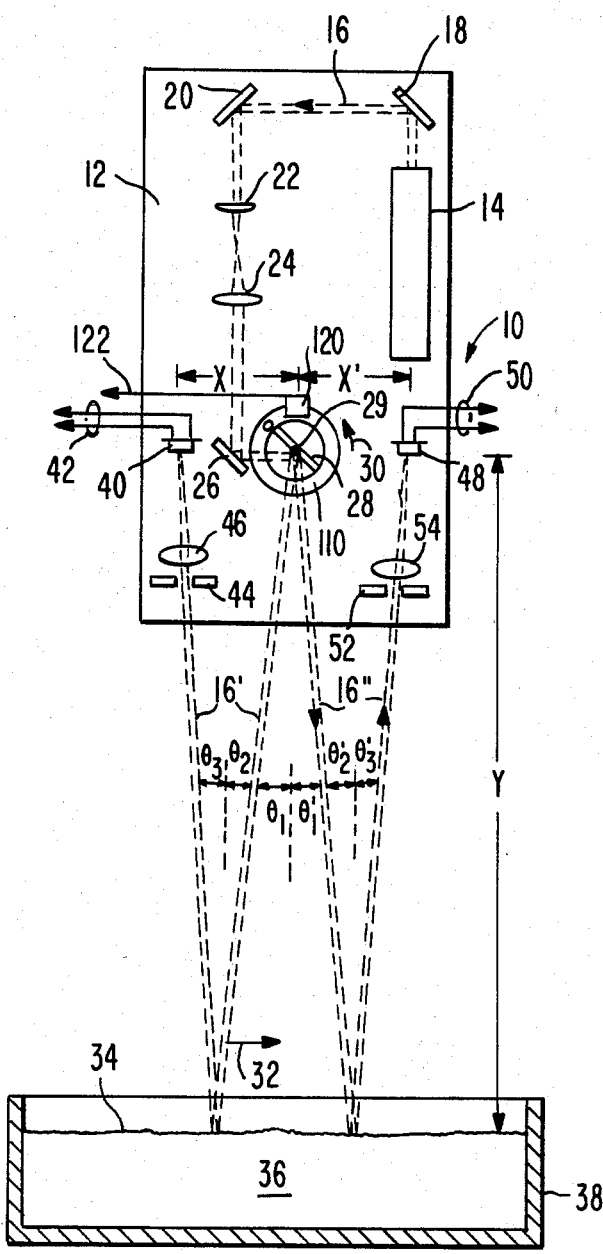
FIG. 1 is a diagrammatic illustration of the electro-optical level sensor of the present invention.

Turning now to a more detailed consideration of the present invention, there is illustrated in FIG. 1 in diagrammatic form a level detector 10 constructed in accordance with the invention. The detector incorporates a suitable base or platform 12 on which is mounted a suitable light source 14 such as a two milliwatt HeNe laser producing an intense, monochromatic light beam 16. The light beam is directed by means of suitable mirrors 18, 20 to a collimator comprised of suitable lens 22 and 24 and is then directed by reflector 26 to a rotating mirror 28. Mirror 28 is mounted on and driven by the shaft 29 of an electric motor (not shown), and preferably is rotated in the manner illustrated in greater detail in the aforesaid copending U.S. patent application Ser. No. 235,400, with the shaft 29 comprising the axis of rotation for mirror 28.

The light beam 16 is directed by mirrors 18, 20 and 22 to a spot on the axis of rotation 29 of the mirror, whereby the beam is reflected from the rotating mirror and is caused to scan in a plane perpendicular to the axis 29. The mirror acts as a scanning source and, when rotated in a counter-clockwise direction as indicated by the arrow 30, causes the beam 16 to sweep in an arc about the axis of rotation 29. Thus, the beam 16, as viewed in FIG. 1, is scanned in a counter-clockwise direction, as indicated by arrow 32, sweeping from left to right.

As the beam sweeps about the axis of mirror 28, it will strike a surface 34, the depth of which is to be measured as a function of its distance Y below the axis of rotation 29. Surface 34 may, for example, be the surface of a liquid carried in a container 36, and thus may be molten glass in a furnace, may be a hydrocarbon fuel in a tank, or the like. At least a portion of the beam 16 will be reflected upwardly from the surface 34 of the liquid 36, the amount of light reflected depending upon the reflectivity of the surface, among other things.

Mounted on the base 12 and spaced from the axis 29 of mirror 28 is a first reflector angle detector 40. This detector is a conventional photocell which responds to an incident light beam to produce an electrical output signal on its output lines 42. The detector 40 is positioned to receive the reflection of beam 16 from the surface 34, but only when the angular position of mirror 28 causes the scanning beam to reach the position indicated at 16' in FIG. 1. At this angle, which is indicated as the angle $\theta_1$ from the vertical, the beam 16' will be reflected from surface 34 at an angle $\theta_2 + \theta_3$ to fall on detector 40. In order to prevent spurious readings, and to insure accuracy in the measurement of the angle of reflection, an aperture plate 44 and a converging lens 46 are positioned in the light path prior to the detector, the lens 46 serving to focus the beam on the surface of the detector.

As the mirror 28 continues to rotate, beam 16 continues to scan across the surface 34 so that its reflection leaves detector 40 and eventually reaches the position indicated at 16", which is at an angle $\theta'_1$ from the vertical and which produces a reflected beam which will fall on the surface of a second detector 48, also spaced from the scanning mirror 28. Detector 48 is similar to detector 40, and is a conventional photocell which will produce on its output lines 50 an electrical impulse upon receipt of the light beam 16". The beam passes through an aperture plate 52 and a converging lens 54 before striking detector 48, as previously explained. Again, the angle of reflection of beam 16" is equal to $\theta'_2 + \theta'_3$, as indicated in FIG. 1.

It will be apparent from the foregoing that continuous rotation of mirror 28 about axis 29 will cause the beam 16 repetitively to scan across the surface 34 from left to right, as viewed in FIG. 1, the reflection of the beam striking detectors 40 and 48 in sequence, producing corresponding spaced output pulses on lines 42 and 50. The timing of these output pulses will depend upon the speed of rotation of the mirror 28 and upon the magnitude of the angles $\theta_1$ and $\theta'_1$. In turn, the magnitude of these angles at the time the output pulses are produced will depend upon the distance Y between the scanning source 28 and the surface 34 as well as upon the spacing between the axis 29 and the detectors 40 and 48, indicated in FIG. 1 by the distances X and X', respectively. If the detectors 40 and 48 lie in a plane common to the axis 29, if that plane is parallel to the surface 34, and if the distances X and X' between the axis 29 and detectors 40 and 48, respectively, are equal, then the angles $\theta_1$ and $\theta'_1$ will be equal, the angles $\theta_2$ and $\theta'_2$ will be equal, the angles $\theta_3$ and $\theta'_3$ will be equal, and the distance Y can be calculated as a function of the time delay between the pulse produced on line 42 and the pulse produced on line 50.

The arrangement illustrated in FIG. 1 in effect provides two depth measurements for the surface 34 during each revolution of mirror 28 so that greater accuracy is obtained. This double measurement of the surface level tends to average out perturbations in the surface due to the effects of ripples, waves, bubbles, or the like, while high speed, continuous scanning of the beam provides a large number of measurements in a short period of time to further reduce the effects of such perturbations. In order to obtain the necessary accuracy, however, it is important that the beam 16 be scanned in a plane which is perpendicular to the surface 34. For convenience in measurement, the detectors 40 and 48 should lie in a plane parallel to surface 34 and should be spaced equidistantly on opposite sides of the axis 29 of the scanning mirror.

Although the scanning mirror 28 is indicated as being mounted on the shaft of a motor for rotation, it will be apparent that scanning can be achieved by oscillation of the mirror rather than rotation, without departing from the basic features of the present invention. Furthermore, although the detectors are shown as being on opposite sides of the rotating mirror, it may be desirable to place the detectors to one side of the scanning source. This arrangement would, of course, change the angles of reflection at which beams 16' and 16" strike detectors 40 and 48, respectively, and thus would change the relationship of the output signals from these two detectors to the depth Y of the surface 34. Accordingly, the preferred form of the invention is illustrated in FIG. 1, with a rotating mirror 28.

As has been indicated, the depth Y of the surface 34 is determined in accordance with the present invention by the angular position of the mirror 28 upon the occurrence of output signals from detectors 40 and 48. In order to establish the required relationship, it is necessary to provide an index signal synchronized with the motion of the mirror and based upon mirror position. In one embodiment of the invention, this may be accomplished by relating the mirror position to the alternating current voltage which supplies the drive motor for the mirror. Such an arrangement is based on the observation that when the plane defined by the detectors 40 and 48 and axis 29 is parallel to the plane defined by surface 34, then the angles $\theta_1$ and $\theta'_1$ are equal, $\theta_1$ is equal to $\theta_2$, $\theta'_1$ is equal to $\theta'_2$, and the absolute values of $\theta_1$ and $\theta'_1$ are inversely proportional to the distance Y between the two planes. The distance Y then becomes a function of the tangent of $\theta_1$.

For small angles in the range of zero to two degrees, the sine and tangent are equal, so that a sine wave derived from the line frequency of the alternating current source can be used to establish the value of Y. In theory, the shaft position of a synchronous motor is directly related to the zero crossing point of the power line frequency. If the zero crossover of the A.C. power line signal is used as an index point, then the value of the sine of the A.C. signal can be used to develop a signal proportional to the distance Y.

Figure 2:
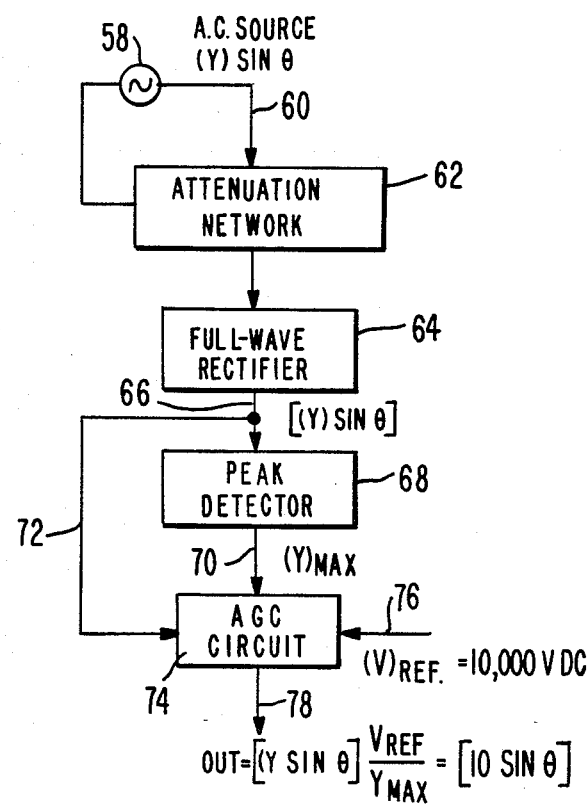
FIG. 2 is a block diagram of a first circuit for deriving a time-variable index signal.

FIG. 2 illustrates in block diagram form a circuit for developing an output signal having the value 10 sine $\theta$, which is proportional to the sine of the line frequency. This circuit receives the line frequency from the A.C. source 58 for the mirror drive motor on line 60, and feeds that signal through an attenuation network 62. The line signal is then fed through a full wave rectifier 64 to produce a D.C. signal having the absolute value [Y sine $\theta$]. This varying D.C. signal is fed by way of line 66 to a peak detector 68 which, in turn, produces an output on line 70 equal to the maximum value of the input on line 60.

The varying D.C. signal on line 66 is also supplied by way of line 72 to an automatic gain control circuit 74 which serves to modify the signal on line 72 in accordance with the ratio of a reference voltage REF of, for example, 10.000 volts applied on line 76, with respect to the peak value Y max. appearing on line 70, thereby producing on its output line 78 an index signal equal to the absolute value of 10 sine $\theta$. This varying index signal is directly proportional to the angular position of the shaft of the synchronous drive motor with respect to its rotational position at the zero crossover point, and thus is proportional to the angular position of mirror 28. Accordingly, this time-varying index signal can be used to relate the time at which detectors 40 and 48 provide outputs to the instantaneous angular position of the mirror, whereby the angle of reflection of beams 16' and 16" can be ascertained.

FIG. 3 illustrates in schematic diagram form the circuit of FIG. 2. Thus, the attenuation network 62 receives its input by way of line 60 from the source of alternating current 58. The attenuating network, which includes resistors 80, 82 and 84, supplies the A.C. signal to fullwave rectifier 64, which includes an operational amplifier 86 having its output connected to the junction of diodes 88 and 90. Diode 90 is connected directly to the negative input of amplifier 86, and diode 88 is connected by way of resistor 92 to the same input. The junction between resistor 92 and diode 88 is connected through resistor 94 to a second operational amplifier 96, the output of which is a D.C. signal which appears on line 66 for application to peak detector 68 and on line 72 for application to the automatic gain control circuit 74.

The peak detector comprises a pair of operational amplifiers 98 and 100 with the output of amplifiers 98 being supplied to the input of amplifier 100 by way of diode 102 and resistor 104, the junction between the diode and the resistor being connected through a storage capacitor 106 to ground. The signal on line 66 applied to the peak detector is fed through amplifier 98 and through diode 102 to the capacitor 106, charging the capacitor to the peak value of the signal on line 66. This signal is amplified by amplifier 100 and appears on line 70 as the desired peak value signal.

The automatic gain control circuit 74 comprises a conventional 4301 integrated circuit connected in conventional manner for automatic gain control, producing the desired index signal on output line 78, as explained above with respect to FIG. 2.

Although the foregoing derivation of a time-varying index signal from the A.C. line source is feasible, problems can occur with such an arrangement because line spikes due to transients on the A.C. line cause a shift in the index point, producing inaccuracies in the measured value. Accordingly, in applications where the line signal may be unreliable, the embodiment of FIG. 4 may be used instead of the FIG. 3 embodiment to produce the desired index signal.

The index signal provided by the FIG. 4 embodiment may be initiated by means of an aperture disc 110 mounted for rotation with mirror shaft 29 (see FIG. 1). Disc 110 carries an aperture 112 having a predetermined, fixed angular relationship with respect to mirror 28, whereby the angular position of the aperture about shaft 29 may be used to identify a specified angular position of the mirror. A source of light such as a light emitting diode (LED) 114 is located on one side of disc 110 and a light detector, such as a photosensitive transistor 116, is located on the opposite side of the disc. Upon rotation of the disc, photosensitive transistor 116 will be illuminated by light from diode 114 each time aperture 112 passes between them, thereby producing an output pulse from transistor 116 once during each revolution of mirror 28. The pulse produced by the transistor 116 identifies the index point in the rotation of the mirror. The light source 114 and the detector 116 may be mounted in a housing 120 located at any desired angular position with respect to shaft 29, although preferably the index point will occur at a time prior to the scanning of surface 34 in rotation of the mirror.

In the preferred form of the invention, the output from transistor 116, which appears on output line 122, is amplified by means of an operational amplifier 124 (FIG. 4), the output of which serves to activate a transistor switch 126. The output of amplifier 124 is applied through series resistor 128 to the base of transistor 126 which then switches on to produce a voltage on its collector, and thus on output line 130. This output operates to open a switch 132 connected across an operational amplifier 134, placing a capacitor 136 in a feedback loop for amplifier 134, and allowing the amplifier to generate on its output line 138 a continuously increasing ramp signal. This ramp serves as a time-variable indexing signal for use in determining the depth of the surface 34.

Figure 7:
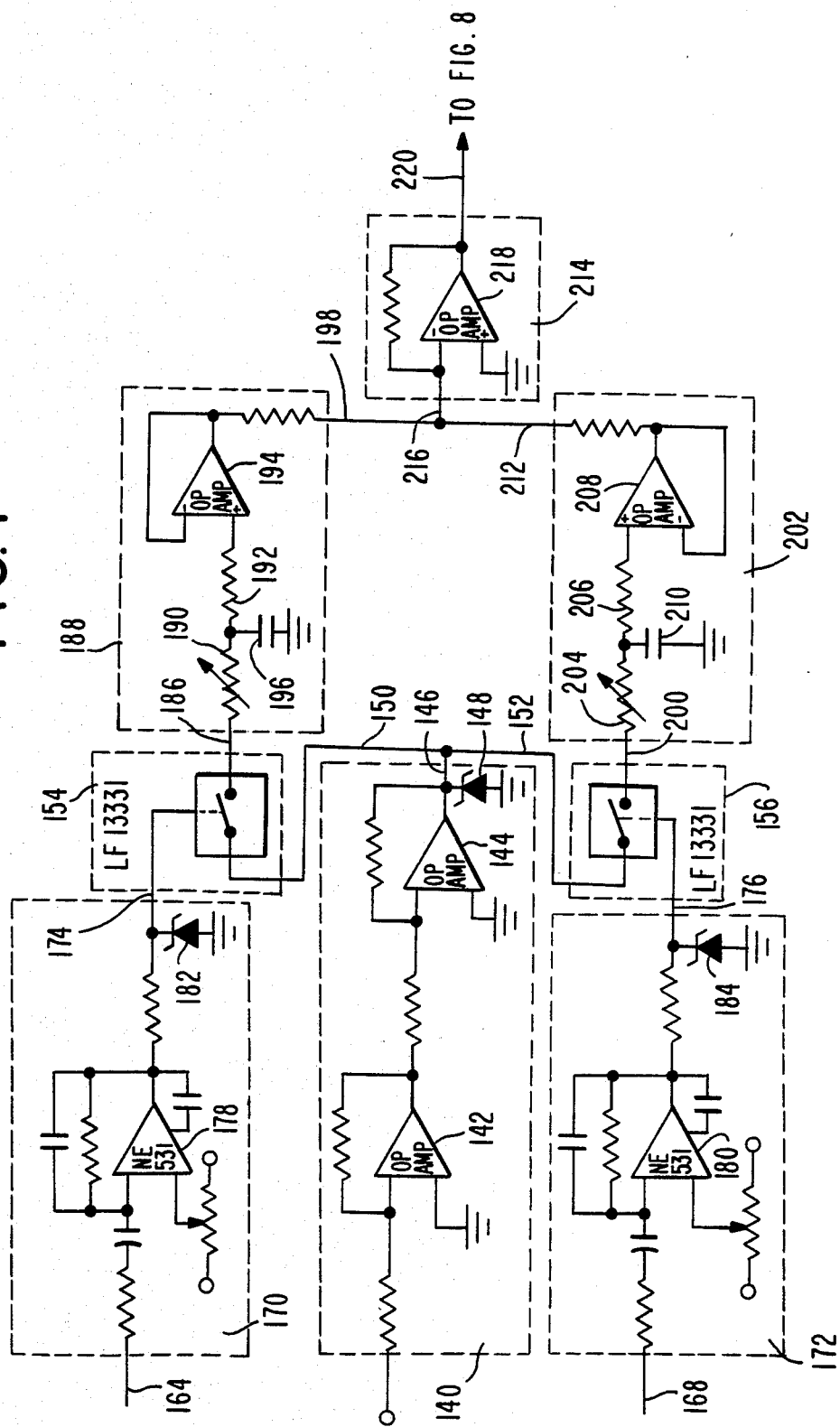
Figure 8:
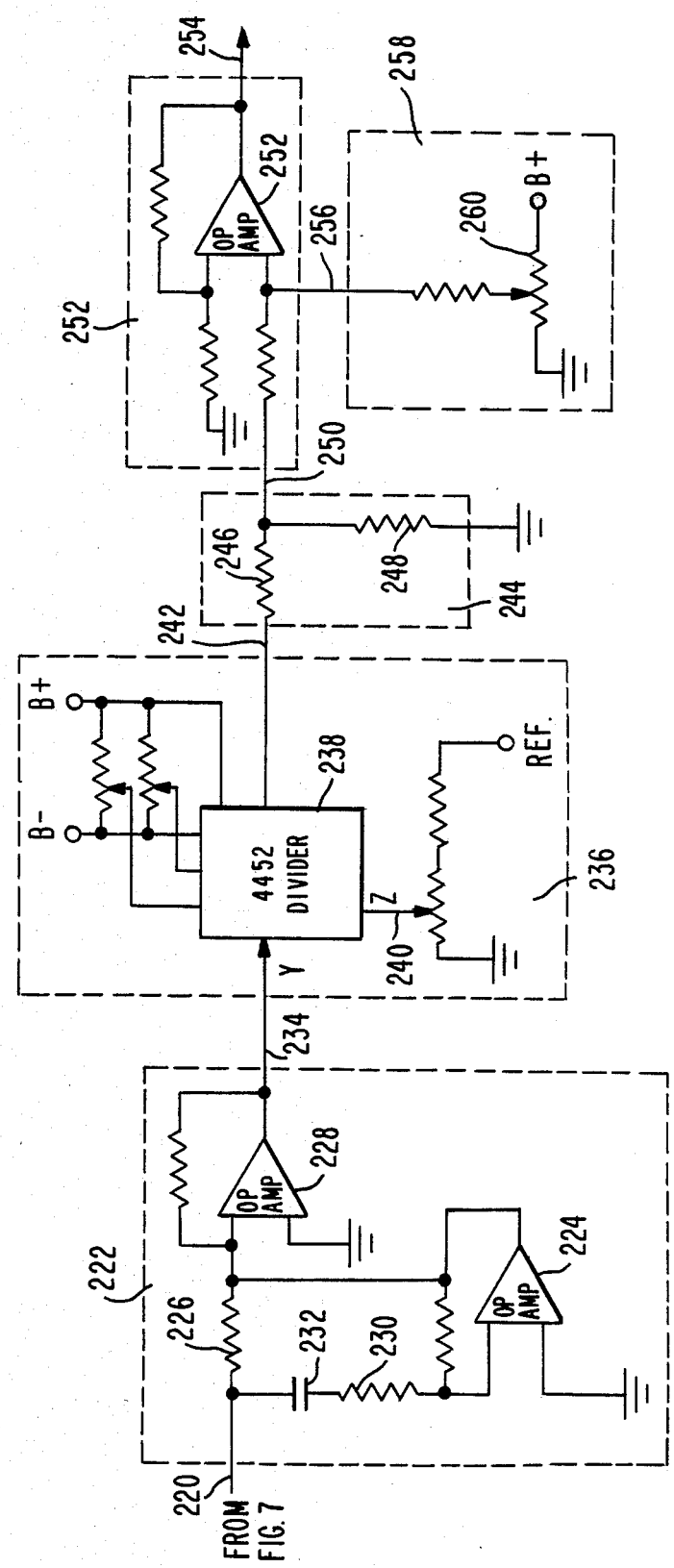

The time varying signal provided by the circuits of either FIG. 2 or FIG. 4 are used as an index signal for the measuring circuit illustrated in block diagram form in FIG. 5, and in schematic form in FIGS. 6, 7 and 8, to which reference is now made. The index signal is applied either from line 78 or from line 138 to an amplifier 140. This amplifier may not be required in the case of the index signal from FIG. 4, and thus is optional. When used, the amplifier 140 may comprise a pair of cascaded operational amplifiers 142 and 144 (FIG. 7), the output of which appears on line 146. This output signal, which appears across a Zener diode 148 to limit the maximum value of the amplifier output, is applied by way of lines 150 and 152 to first and second analog switches 154 and 156, respectively. These switches are controlled by the output pulses from the first and second photoelectric detectors 40 and 48, respectively, to feed timed samples of the amplified time-varying index signal to the angle measuring circuitry to be described.

The output from beam detector 40 in response to the incidence of beam 16′ is supplied by way of lines 42 to a detector preamplifier 158 which, as illustrated in FIG. 6, may consist of a pair of cascaded solid-state amplifiers 160 and 162 connected in conventional manner to produce an amplified detector output pulse on line 164. This preamplifier is used to improve the signal-to-noise ratio of the detector signal. It will be understood that the output from photocell 48 in response to the incidence of beam 16″ appearing on lines 50 is supplied to a corresponding preamplifier 166 which is substantially identical to the preamplifier illustrated in FIG. 6 and which produces a detector output pulse on line 168.

The output pulses on lines 164 and 168 are fed to corresponding amplifiers 170 and 172 which produce on their respective outputs 174 and 176 amplified detector pulses corresponding to the illumination of the detectors 40 and 48 by the reflected beams. These amplifiers are illustrated in schematic form in FIG. 7 as being conventional solid-state amplifiers 178 and 180 connected in conventional manner, with their output lines 174 and 176 being connected across Zener diodes 182 and 184, respectively, the diodes serving to limit the output voltages from the amplifiers.

The output pulses appearing on lines 174 and 176 are supplied to the analog switches 154 and 156, respectively, and serve to close these switches. The analog switches are diagrammatically illustrated as single pole-single throw switches which remain closed for the duration of the respective detector pulses, the switches closing at the beginning of the respective pulses and openings at the end thereof.

Closure of switch 154 by the detector pulse on line 174 serves to connect the time varying signal appearing on line 150 to the switch output line 186, feeding a timed sample of the time varying signal to an averaging sample and hold circuit 188. This circuit includes an R.C. network comprising a variable resistor 190 connected in series with a second resistor 192 to the input of an operational amplifier 194, the junction of resistors 190 and 192 being connected through a storage capacitor 196 to ground. The time varying reference signal appearing on line 150 is applied by way of line 186 to capacitor 196 for the duration of the detector pulse on line 174, thereby storing in the capacitor a voltage proportional to the value of the reference signal on line 150 during that time period.

The voltage on capacitor 196 causes the operational amplifier 194 to produce an output voltage on line 198 which has an amplitude proportional to the average value of the reference signal on line 150 for the time period that it was applied to the capacitor; i.e., for the duration of the output pulse produced by detector 40. By establishing a proper time constant for the R.C. network which includes resistors 190 and 192 and capacitor 196, the output on line 198 will remain relatively constant for one scanning cycle; i.e., for one complete revolution of the scanning mirror 28. Since the time varying signal starts at a specified angular position of the mirror 28, and since the rate of rotation of the mirror is known, the magnitude of the voltage on line 150 at the time when the switch 154 is closed, and thus the magnitude of the voltage appearing on line 198, is a measure of the time elasped from the index point to the occurrence of the detector pulse when the light strikes detector 40. This elasped time is an indication of the angular position of mirror 28 when the detector pulse occurs, and thus the amplitude of the signal on line 198 is proportional to, and is a measure of, the angle $\theta_1$.

In similar manner, the occurrence of a detector pulse on line 176 closes switch 156 to connect the time varying signal appearing on line 152 through switch 156 to its output line 200 and thence to a second averaging sample and hold circuit 202. The signal appearing on line 200 is fed through a variable resistor 204 in the sample and hold circuit 202, and through a fixed resistor 206 to one input of an operational amplifier 208. A storage capacitor 210 is connected from the junction of resistor 204 and 206 to ground and serves to store the voltage appearing on line 152 during the time that switch 156 is closed. This voltage produces at the output 212 of amplifier 208 a steady state voltage having a magnitude proportional to the amplitude of the time varying signal on line 152 at the time the beam strikes detector 48. Accordingly, the amplitude of the signal on line 212 is proportional to the angular position of mirror 28 at that time, and thus is proportional to, and is a measure of, the angle $\theta'_1$.

The signals appearing on lines 198 and 212 are summed in an adder 214, the signals being applied to the input of the adder by way of line 216. The adder 214 includes an operational amplifier 218 which receives the signal on line 216 and produces at its output 220 a D.C. signal which is amplified by a factor of $-0.5$. This signal, which is the average of the values representing $\theta_1$ and $\theta'_1$, is fed to the input of an inverting active filter 222, illustrated in schematic form in FIG. 8.

The inverting active filter 222 comprises a first operational amplifier 224 connected across a series resistor 226 connected between the input line 220 and one input of a second operational amplifier 228. Line 220 is connected to the input of amplifier 224 through an R.C. filter network comprising resistor 230 and capacitor 232, with its output being connected to the input of amplifier 228. The output of amplifier appears on line 234, and is a filtered version of the signal appearing on line 220 with an improved signal to noise ratio.

The filtered signal on line 234 is supplied to an input Y of a divider network 236 which, for example, may incorporate an integrated circuit 238 comprising a 4452 chip connected as a divider. A reference voltage is supplied to the divider input Z on line 240, and its output is the ratio of the signal appearing on line 234 to the reference voltage appearing on line 240, or Y/Z. The reference voltage preferably is equal to the maximum value of the index signal appearing on line 148. The ratio Y/Z is proportional to the sum of angles $\theta_1$ and $\theta'_1$, and represents the distance Y between the measuring detectors 40 and 48 and the surface 34 being measured, as previously explained. This value may be fed through a voltage divider 244 comprising divider network resistors 246 and 248 to produce on line 260 a signal for recording or display. This signal may then be fed through a buffer amplifier 250, consisting of an operational amplifier 252, to produce the final output signal on line 254. Adjustment of this output signal for zeroing of the measurement system and to compensate for variations in ambient temperature and the like is accomplished by means of an offset signal supplied to the input of operational amplifier 252 by way of offset line 256. The offset signal may be derived from a suitable source such as a manually variable potentiometer 260.

It will be noted that the above-described processing of the output signals from the detectors 40 and 48 is valid only when the plane of the surface to be detected and the plane of the two detectors are parallel, and when the detectors are equally spaced on opposite sides of the scanning source. In cases where the two planes are not parallel, and thus where the angles $\theta_1$ and $\theta'_1$ are different, the signals produced by the two detectors must be separately processed. In such a system, the detector outputs sample a ramp or index signal, as before, but instead of being added together, the sampled values are maintained in separate channels for analysis. In such a case, each signal is analyzed to produce resultant signals proportional to the depth of the surface.

The two-detector arrangement as set forth herein has been found to provide significantly improved measurement of the depth of a surface, with improved sensitivity and, through the use of suitable filtering, a significant reduction in the error rate caused by perturbations of the surface. Although the present invention has been set forth in terms of specific embodiments, it will be apparent to those of skill in the art that numerous modifications and variations can be made without departing from the true spirit and scope thereof as set forth in the following claims:

What is claimed is:

1. Level detection apparatus for measuring the depth of a surface, comprising:
    a source of high intensity light;
    scanning means adapted to be located above the surface to be measured, said scanning means being movable to scan a beam of light from said source repetitively across the surface;
    first and second detector means responsive to reflections of said beam from the surface to be measured to produce corresponding output pulses, said detector means lying in a first plane which is common to said beam of light and normal to the surface to be measured;
    means for generating a time-varying signal in synchronization with the movement of said scanning means;
    first circuit means responsive to an output pulse from said first detector means to obtain a first sample of said time-varying signal;
    second circuit means responsive to an output pulse from said second detector means to obtain a second sample of said time varying signal; and
    third circuit means responsive to said first and second samples for producing output signals proportional to the angles at which said beam was reflected to said first and second detectors.

2. The level detection apparatus of claim 1, wherein said first and second detectors lie in a second plane common to said scanning means and are adapted to be located above and parallel to the surface to be measured.

3. The level detection apparatus of claim 2, wherein said first and second detectors are spaced equidistantly on opposite sides of said scanning means.

4. The level detection apparatus of claim 3, wherein said scanning means comprises a motor-driven mirror having an axis of rotation which lies in said second plane and intersects said first plane.

5. The level detection apparatus of claim 4, wherein said scanning means comprises a mirror having an axis of rotation which lies in said second plane.

6. The level detection apparatus of claim 1, wherein said means for generating a time-varying signal includes indexing means for initiating said time-varying signal.

7. The level detection apparatus of claim 6, wherein said scanning means is driven by a periodic power source, and wherein said indexing means comprises circuit means responsive to a crossover point in said power source.

8. The level detection apparatus of claim 7, wherein said scanning means is motor driven and said motor is energized by said power source, said power source comprising an alternating current source, and said indexing circuit means being responsive to a zero crossover of said alternating current source.

9. The level detection apparatus of claim 8, wherein said indexing circuit means comprises rectifier means energized by said alternating current source to produce a varying D.C. signal.

10. The level detection apparatus of claim 6, wherein said indexing means comprises photoelectric means responsive to the motion of said scanning means for starting said time-varying signal at a predetermined position of said scanning means.

11. The level detection apparatus of claim 10, wherein said time-varying signal is proportional to the angular position of said scanning means.

12. The level detection apparatus of claim 11, wherein said time-varying signal is a ramp signal.

13. The level detection apparatus of claim 12, wherein said first and second detectors lie in a second plane common to said scanning means.

14. The level detection apparatus of claim 13, wherein said first and second detectors are spaced equidistantly on opposite sides of said scanning means, and wherein said second plane is adapted to be parallel to the surface to be measured, whereby the angle at which a beam of light from said scanner reflects off said surface to said first detector is equal to the angle at which a beam of light from said scanner reflects off said surface to said second detector.

15. The level detector of claim 14, wherein said third circuit means comprises adder means for adding the amplitudes of said first and second samples, the sum of the samples representing the sum of said angles, and thus being proportional to the depth of the surface.

16. The level detection apparatus of claim 1, wherein said detectors are located adjacent to said scanning means, sufficiently closely that a beam which is reflected from a surface to be measured to one of said detectors forms an angle of less than about 2° with a line perpendicular to the surface.

17. The level detection apparatus of claim 16, wherein said source of light is a laser.

* * * * *